(12) United States Patent
Schiavinato (10) Patent No.: US 12,248,113 B2
(45) Date of Patent: Mar. 11, 2025

(54) METAL DETECTOR WITH SAMPLED ARCHITECTURE

(71) Applicant: XPLORER, Castanet Tolosan (FR)

(72) Inventor: David Schiavinato, Castanet Tolosan (FR)

(73) Assignee: XPLORER, Castanet Tolosan (FR)

( * ) Notice: Subject to any disclaimer, the term of this patent is extended or adjusted under 35 U.S.C. 154(b) by 0 days.

(21) Appl. No.: 18/697,505

(22) PCT Filed: Oct. 4, 2022

(86) PCT No.: PCT/EP2022/077603
§ 371 (c)(1),
(2) Date: Apr. 1, 2024

(87) PCT Pub. No.: WO2023/012377
PCT Pub. Date: Feb. 9, 2023

(65) Prior Publication Data
US 2024/0264328 A1    Aug. 8, 2024

(30) Foreign Application Priority Data
Oct. 4, 2021 (FR) ........................... 2110487

(51) Int. Cl.
*G01V 3/10* (2006.01)
(52) U.S. Cl.
CPC ........................ *G01V 3/10* (2013.01)
(58) Field of Classification Search
CPC ............. G01V 3/10; G01V 3/12; G01V 3/165
See application file for complete search history.

(56) References Cited

U.S. PATENT DOCUMENTS

| | | | |
|---|---|---|---|
| 2005/0253711 A1* | 11/2005 | Nelson | F41H 11/136 340/552 |
| 2007/0052576 A1* | 3/2007 | Hausner | G01S 7/024 342/195 |
| 2008/0074114 A1* | 3/2008 | Candy | G01V 3/104 324/326 |
| 2009/0045813 A1 | 2/2009 | Emery | |
| 2014/0232408 A1* | 8/2014 | Candy | G01V 3/104 324/329 |
| 2018/0372904 A1* | 12/2018 | Moreland | G01V 3/02 |
| 2019/0238152 A1 | 8/2019 | Pagnanelli | |
| 2019/0377100 A1 | 12/2019 | Zheng et al. | |
| 2020/0350787 A1 | 11/2020 | Enderlin et al. | |

OTHER PUBLICATIONS

International Search Report (with English Translation) and Written Opinion (with machine translation) for PCT/EP2022/077603, dated Jan. 10, 2023, 12 pages.

* cited by examiner

*Primary Examiner* — Giovanni Astacio-Oquendo
*Assistant Examiner* — Haidong Zhang
(74) *Attorney, Agent, or Firm* — Tucker Ellis LLP (57) ABSTRACT

The invention relates to the technical field of magnetic detection. In particular, it relates to a metal detector for detecting at least one metallic object exposed to a detection magnetic field. A metal detector that uses a sampled-architecture receiver yields a sampling operation separate from the quantization and encoding operations. As a result, sampling can be done directly on the reception signal and most of the signal processing is done in a discrete-time manner (e.g., by the use of switched-capacitor systems with MOS switches for the switching).

13 Claims, 6 Drawing Sheets

Fig. 11

METAL DETECTOR WITH SAMPLED ARCHITECTURE

TECHNICAL FIELD

The invention relates to the technical field of magnetic detection. In particular, it relates to a metal detector for detecting at least one metallic object exposed to a detection magnetic field.

PRIOR ART

Metal detectors are mainly used in the field of security, in airports to detect weapons hidden on the passengers of an airplane, in the military field for mine clearance, in leisure for the search for various buried objects, or in archaeology for the search for ancient objects.

Among the most widespread families of metal detectors are so-called "passive" metal detectors and so-called "active" metal detectors.

Passive metal detectors sense and evaluate the deformations of the Earth's magnetic field, while active metal detectors produce in their transmission phase an electromagnetic field that induces eddy currents in metals.

We will briefly describe an example of a passive metal detector before describing examples of active detectors, which are the subject of the invention.

The magnetometer is a passive detector which does not transmit any signal. In particular, it detects breaks in homogeneity, considering that the Earth's magnetic field is homogenous by nature. Thus, any metal particle, magnetized by the Earth's field, disrupts this homogeneity more or less intensely according to its size, its position and its metallurgical properties. The base principle of a magnetometer is based on two coils which are sensitive to magnetic fields and which are mounted in phase opposition, so as to give a zero electrical measurement of the magnetic field. If one of these coils encounters a disruptive field, the difference ceases to be zero, which gives rise to a voltage, making it possible to locate and discern a metallic object.

Active detectors particularly comprise Beat Frequency Oscillator (BFO), Induction Balance (IB), and Pulse Induction (PI) detectors.

In a BFO detector, an oscillator is used, which is a resonant circuit, with the coil of the sensor as inductance. The presence of a metallic object modifies the inductance and therefore the frequency of the oscillator. The analysis of this frequency by mixing with a neighboring frequency makes it possible to indicate the presence of metals. In this case, the coil of the sensor acts as transmitter and receiver simultaneously.

In a detector IB, at least two coils are used. One is called the transmitter and is powered by a repeating electrical generator, while the other is the receiver. The two coils are arranged such that their mutual coupling (their mutual induction) is zero (or as low as possible). Unlike an electrical transformer, which is arranged so that the coupling between the two coils (primary and secondary) is at a maximum, the reception coil ideally delivers no signal when the transmission coil is operational. The construction of the induction balance is based on the symmetry properties of the magnetic field induced by the coils. As soon as a metallic object becomes immersed in this magnetic field, the equilibrium is broken and the reception coil delivers a signal. This signal is out of phase with respect to the excitation field. The analysis of its phase and/or its gain makes it possible to detect the presence and nature of metallic objects. This detector is very commonly used due to its beneficial features. It is often found among seekers of precious metals, among beachcombers, and in the building industry when searching for buried ducts or cable channels.

Finally, a PI detector operates twice. In a first phase, a pulsed magnetic field is induced. This is usually an approximation of a true pulse (Dirac). The metallic parts encompassed by the field are the locus of eddy currents. As soon as the excitation comes to an end, the eddy currents relax (decrease over time to reach a zero value). These eddy currents induce a magnetic field, the secondary or back-induced field, which is measured by the detector during the second phase, called listening phase. The voltage induced across the terminals of the coil is extremely low during this phase, typically of a few mV to less than 1 uV. Usually, detectors implement an averaging mechanism which accumulates the signal over several pulses to improve the signal-to-noise ratio. The detector transcribes this average value by an audio signal. This detector is characterized by a very low sensitivity to ferromagnetic bodies (as long as they are poor conductors, such as iron oxides), and a better sensitivity to others. A single coil can act as transmitter and receiver or they can be separate. The increased complexity of the peripheral circuit for reading and interpreting the signal makes the cost of this sensor higher. Among the applications of this detector are gold prospecting and mine clearance.

In other words, in order to locate and discern a metallic object in a given area of surveillance, active metal detectors use a transmitter-receiver system (with one or more coils) which makes use of the physical phenomenon of magnetic induction.

In practice, a transmitter is configured to transmit, by a transmitter coil, a primary magnetic field, which is time-dependent, in the surveillance area. Then, a receiver is configured to measure, by a receiver coil, secondary magnetic fields that result from the eddy currents induced in any metallic object (the term "remanent magnetization" is also used) present in an area of influence of the primary magnetic field.

Owing to this system, the detection of secondary magnetic fields inside a surveillance area indicates the presence of at least one metallic object inside the surveillance area.

In practice the detection operation consists in filtering, amplifying, demodulating and discerning, at the receiver, a real reception signal which varies as a function of time and which the receiver coil receives.

In general, the operation of demodulation can be done for a discernment in the frequency domain, (the term Frequency Domain or FD detector is then used), or in the time domain (the term Time Domain or TD detector is then used).

In the special case of an FD detector, the transmitter generally powers a transmitter coil with one or more sinusoidal alternating currents to set up one or more magnetic fields transmitted over one or more transmission frequencies (the term sinusoidal detector, or CW (Continuous Wave) detector is then used). Thus, an FD detector receiver performs the operation of demodulation by the discern of the amplitude and the phase of one or more detection frequencies which are substantially equal to the transmission frequencies.

A CW receiver can receive a reception signal over a detection channel or several detection channels.

The term "detection channel" should be understood to mean a range of frequencies of electromagnetic waves.

In a known manner, each detection channel has a specific detection frequency, $f_D$, (also known as the carrier frequency) which corresponds to the central frequency of the range of frequencies of the detection channel.

In a first example, the detection frequency or frequencies are chosen from among the VLF (Very Low Frequency) band.

The term "VLF signal" is a so-called Very Low Frequency frequency band, namely between 3 kHz and 30 kHz approximately.

In a second example, the detection frequency or frequencies are chosen from among the eVLF (extended Very Low Frequency) band.

The term "eVLF signal" should be understood to mean a frequency known as extended Very Low Frequency, namely, between 20 Hz and 200 kHz approximately.

Conventionally, the "bandwidth" of a detection channel refers to the width of the range of frequencies of the detection channel which is contained between a minimum frequency and a maximum frequency.

In practice, the bandwidth of the detection channel is said to be "narrow", since the central frequency of the detection channel is very high by comparison with the bandwidth of the reception signal. For example, in the field of metal detectors, the bandwidth of a detection channel is determined by the relative displacement speed of the targets with respect to the detector and only rarely exceeds 100 Hz.

Figure 1:
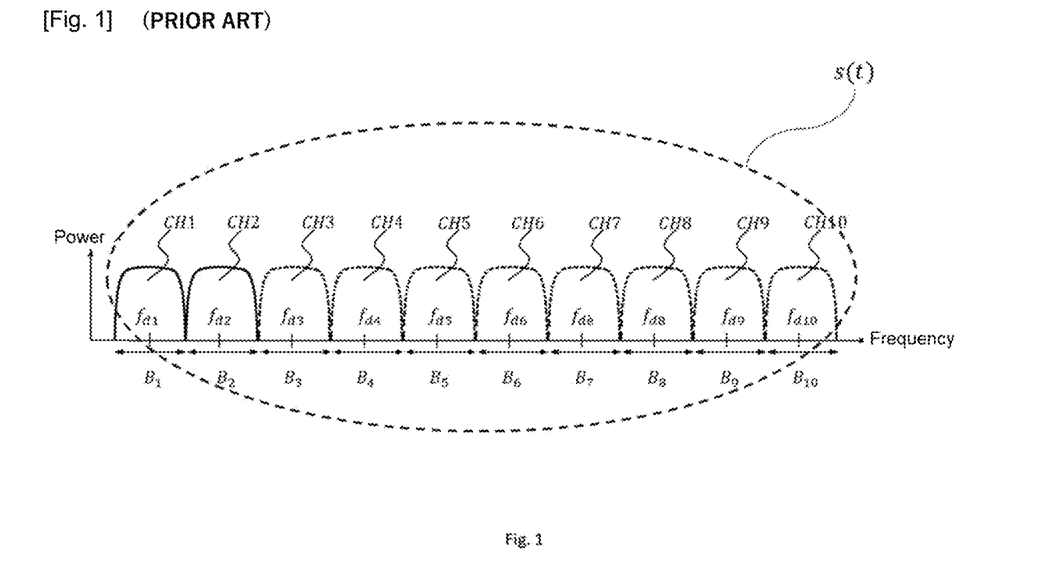
FIG. 1 shows a spectrum of two reception frequencies of a real reception signal.

FIG. 1 illustrates a reception frequency spectrum of a real reception signal s(t) as received by a receiver coil of a metal detector. In the example of FIG. 1, the reception signal s(t) is received over ten channels, channel CH1 to channel CH10. In particular, each channel CH1 to CH10 has a first corresponding detection frequency $f_{d1}$ to $f_{d10}$ and a corresponding bandwidth $B_1$ to $B_{10}$. In practice, the bandwidths $B_1$ to $B_{10}$ are equal.

In practice, to facilitate the demodulation operation, arrangements are made to obtain a reception signal which has two separate channels (the term "IQ signal" is then used, with I the in-phase component and Q the quadrature component). One of the advantages of such a signal form is that it is representative of the whole spectrum of a reception signal with no loss of information. Moreover, in a detector, the I and Q components can be used to determine the reactive part and the resistive part of a metallic object, and in such a way as to enable the identification of the metal of which the metallic object is composed.

In an example, the two channels of the IQ signal are in phase quadrature. In practice, an IQ signal is a complex signal which is expressed in the following mathematical form:

$$IQ = \text{signal} = A * \exp(j * \alpha) \qquad \text{[Math 1]}$$

with A its amplitude and $\alpha$ its phase.

The formula [Math 1] can then be broken down as follows:

$$IQ \text{ signal} = A * \cos(\alpha) + j * A * \sin(\alpha). \qquad \text{[Math 2]}$$

The formula [Math 2] can then be simplified as follows:

$$IQ \text{ signal} = I + jQ \text{ with} \qquad \text{[Math 3]}$$

$$I = A * \cos(\alpha) \text{ and } Q = A * \cos(\alpha).$$

Finally, with an IQ signal which is represented by the formula [Math 3], the amplitude and phase can easily be recovered.

Specifically, the amplitude is obtained using the following formula:

$$A = \sqrt{(I^2 + Q^2)} = |I + j*Q|. \qquad \text{[Math 4]}$$

Furthermore, the phase can be obtained using one of the following formulae:

$$\alpha[\pi] = \arctan\left(\frac{Q}{I}\right) \qquad \text{[Math 5]}$$

with [•] the modulo function;

$$\alpha = \arg(I + j*Q) = a\tan2(I, Q) \qquad \text{[Math 6]}$$

with a tan 2(•) a known function that returns the arctangent of the ratio of two variables x and y, express in radians, between $-\pi$ and $\pi$ (inclusive).

Of course, it can also be envisioned to use another bijective basis than quadrature separation, particularly using a phase separation different to $\pi/2$.

In an example of a CW detector of the prior art, a single-frequency real reception signal s(t) takes the following mathematical form:

$$s(t) = A(t) * \cos(2 \times \pi \times f_D \times t + \alpha(t)), \qquad \text{[Math 7]}$$

with A its amplitude, $f_D$ its detection frequency, t the time, and a its phase. In the case of a multifrequency reception signal, this corresponds to a sum of several single-frequency reception signals s(t).

To simplify the formula [Math 7], it is common to compress $2 \times \pi \times f_D$ into $\omega$, with $\omega$ which corresponds to the angular pulse of the signal, which is almost time-invariant. In this case, the formula [Math 7] can be rewritten as follows:

$$s(t) = A(t) * \cos(\omega * t + \alpha(t)) \qquad \text{[Math 8]}$$

Next, the channels I and Q of s(t) are extracted separately. To extract the channel I, the following operation is performed:

$$2*\sin(-\omega \cdot t)*s(t) = A(t)*\sin(\varphi(t)) + A(t)*\sin(2 \cdot \omega \cdot t + \varphi(t)) \qquad \text{[Math 9]}$$

Then, a low-pass filter is applied to the result of the formula [Math 9] which rejects the signals at the frequency $2 \times f_D$ to obtain $$I = A(t) * \sin(\varphi(t)).$$

To extract the channel Q, the following operation is performed:

$$2*\cos(-\omega \cdot t)*s(t) = A(t)*\cos(\varphi(t)) + A(t)*\cos(2\cdot\omega\cdot t + \varphi(t)) \quad \text{[Math 10]}$$

Then, a low-pass filter is applied to the result of the formula [Math 10] which rejects the signals at the frequency $2\times f_D$ to obtain $$Q = A(t)*\cos(\varphi(t)).$$

In a known manner, to simplify computations in a digital system, the different values that the functions cos(•) and sin(•) can take are stored in the memory. The multiplications are then performed using mixers. However, such an architecture consumes a good deal of memory and computational power.

Thus, a need exists for the provision of an alternative demodulation solution which does not consume a good deal of memory and computational power.

SUMMARY OF THE INVENTION

The invention aims to meet these needs, at least in part.

The invention in particular relates to a metal detector for detecting at least one metallic object exposed to a detection magnetic field.

In particular, the metal detector comprises:
at least one reception coil arranged to receive a magnetic field signal, called reception signal, s(t), which is representative of at least one modification of the detection magnetic field under the influence of the metallic object, the reception signal, s(t), comprising at least one detection channel of given bandwidth, each detection channel being associated with a separate detection frequency, $f_D$ and
at least one sampled-architecture receiver which is coupled to the reception coil, wherein,
the sampled-architecture receiver comprises a first sampling device of non-quantizing type, called first sampler, which is configured to sample the reception signal, s(t), or a signal that is a derivative of the reception signal, |s(t)|, |s(t)*|, |s'[t]|, |s'[t]*|, |s_+[t]|, at a first sampling frequency, f1, which observes the Nyquist-Shannon bandwidth sampling theorem, in such a way as to
deliver a discrete-time signal, called first sampled signal, s[t], which, in the spectral domain, corresponds to a replica signal of the reception signal, s(t), or of the signal that is a derivative of the reception signal, s'[t], and
frequency-transpose the reception signal, s(t), to a first intermediate frequency which is less than the detection frequency, $f_D$.

In a first embodiment, the sampled-architecture receiver further comprises a real-to-complex conversion device which is coupled downstream of the first sampler, and which is configured to convert the first sampled signal, s[t], s"[t], into a complex signal, s[t]*, s"[t]* which has an in-phase component, I[t], and a quadrature component, Q[t].

In an implementation of the first embodiment, the first sampling frequency, f1, observes the following relationship:

$$f_D \approx \left(\frac{2*n+1}{4}\right)\times f1,$$

with $f_D$ the detection frequency of the detection channel of the reception signal s(t), n a natural integer and f1 the first sampling frequency.

Moreover, in this implementation of the first embodiment, the real-to-complex conversion device comprises a first discrete-time mixer, a second discrete-time mixer, a discrete-time low-pass filter, the discrete-time low-pass filter being coupled,
downstream of the first discrete-time mixer in such a way as to deliver the in-phase component, I[t], and
downstream of the second discrete-time mixer in such a way as to deliver the quadrature component, Q[t].

In a second embodiment, the sampled-architecture receiver further comprises a continuous-time anti-aliasing filter which is coupled upstream of the first sampler, the continuous-time anti-aliasing filter having a bandwidth which is configured to be centered on at least any one of the detection frequencies associated with the reception signal, s(t), in such a way as to limit the bandwidth of the reception signal, s(t), around at least any one of the detection frequencies and to deliver a filtered reception signal, |s(t)|.

In a third embodiment, the sampled-architecture receiver further comprises,
a second sampling device of non-quantizing type, said second sampler coupled upstream of the first sampler, and
a discrete-time anti-aliasing filter coupled between the first sampler and the second sampler.

Moreover, in this third embodiment,
the second sampler is configured to sample the reception signal, s(t), at a second sampling frequency, f2, which observes the Nyquist-Shannon bandwidth sampling theorem, such as to deliver a signal that is a derivative of the reception signal, called second sampled signal, s'[t], which, in the spectral domain, corresponds to a replica signal of the reception signal s(t), and
the discrete-time anti-aliasing filter has a bandwidth which is configured to be centered on at least any one of the detection frequencies associated with the reception signal, s(t), in such a way as to limit the bandwidth of the second sampled signal, s'[t], around at least any one of the detection frequencies and to deliver a sampled and filtered reception signal, |s'[t]|.

Finally, in this third embodiment, the second sampling frequency, f2, is furthermore configured to frequency-transpose the reception signal, s(t), to a second intermediate frequency which is greater than the first intermediate frequency and less than or equal to the detection frequency, $f_D$.

In an implementation of the third embodiment, the metal detector further comprises an oversampling device of non-quantizing type, called oversampler coupled between the second sampler and the discrete-time anti-aliasing filter.

In a particular implementation of the second embodiment and of the third embodiment, the continuous-time anti-aliasing filter and/or the discrete-time anti-aliasing filter is a filter of complex bandpass type which is configured to convert the reception signal, s(t), or a signal that is a derivative of the reception signal, s'[t], into a filtered complex signal, |s(t)*|, |s'[t]*|, which has an in-phase component, I[t], and a quadrature component, Q[t].

In a fourth embodiment, the sampled-architecture receiver further comprises a quantizer and an encoder, the quantizer being configured to quantize the first sampled signal, s[t], and/or the second sampled signal, s'[t], in such a way as to deliver a quantized signal, the encoder being configured to encode the quantized signal in such a way as to deliver a digital signal.

In a fifth embodiment, the detection frequency or frequencies are chosen from among: the VLF frequency band and the eVLF frequency band.

In a sixth embodiment, the metal detector further comprises at least one transmission coil arranged to generate the detection magnetic field.

In a seventh embodiment, the metal detector further comprises several sampled-architecture receivers, in which each sampled-architecture receiver is configured to process the reception signal, s(t), at a particular detection frequency, $f_D$.

In an eighth embodiment, the metal detector further comprises means for selecting, automatically or at the command of the user, the detection frequency or frequencies.

In a ninth embodiment, the metal detector further comprises,
a support stick,
a detection head which is disposed at one end of the support stick, and which is configured to house the reception coil(s) and/or the transmission coil(s), and
at least one processor coupled to the detection head and configured to manage the operation of the detection head and make use of the information coming from it.

BRIEF DESCRIPTION OF THE DRAWINGS

Other features and advantages of the invention will be better understood on reading the following description and with reference to the appended drawings, given by way of illustration and in no way limiting.

In the different figures, the dotted lines and arrows indicate optional elements, steps and sequences.

DESCRIPTION OF THE EMBODIMENTS

One of the aims of this invention is to provide a metal detector which makes provision for an alternative demodulation solution that does not consume much memory and computational power.

To do so, the inventor makes provision for a metal detector which uses a sampled-architecture receiver in which a frequency transposition is performed by sub-sampling, which makes controlled use of spectrum aliasing (which means it does not seek to avoid spectrum aliasing) using the Nyquist-Shannon bandwidth sampling theorem.

Thus, unlike the prior art, it is not necessary to use a mixer (i.e. which performs a multiplication of a reception signal with a local oscillator) to perform a frequency transposition.

However, it is known that the use of a mixer, in receiver architecture, consumes a good deal of memory and/or computational power In particular, in a sampled-architecture receiver, the sampling operation is separate from the quantization and encoding operations. By comparison, in conventional architectures, these three operations are usually performed in parallel in an Analog-to-Digital Converter (or ADC).

In the context of a sampled architecture, the sampling is performed directly on the reception signal and most of the processing of the signal is done in discrete time (e.g. using switched-capacitor systems with MOS switches for the switching).

The term "discrete-time" means a field of values representative of time which is defined by a countable set in a finite time window. To simplify the understanding of this document, it will be considered that the discrete-time period is fixed.

In the description, the metal detector according to the invention will be considered to be an FD detector.

Thus, the invention relates to a metal detector for the detection of at least one metallic object.

In the invention, the metallic object is exposed to a detection magnetic field, such as that generated by a transmission coil of a metal detector.

In particular, the detection magnetic field makes it possible to magnetize a metallic object.

In the invention, the metal detector comprises at least one reception coil and at least one receiver that is coupled to the reception coil.

Thus, the invention also covers a metal detector which comprises two or more reception coils and/or two or more receivers.

Of course, the invention also covers a multi-channel system (i.e. multi-frequencies) which would comprise several receivers according to the invention.

Thus, the invention covers a multichannel metal detector which uses two, three, four, five or more detection frequencies.

Figure 2:
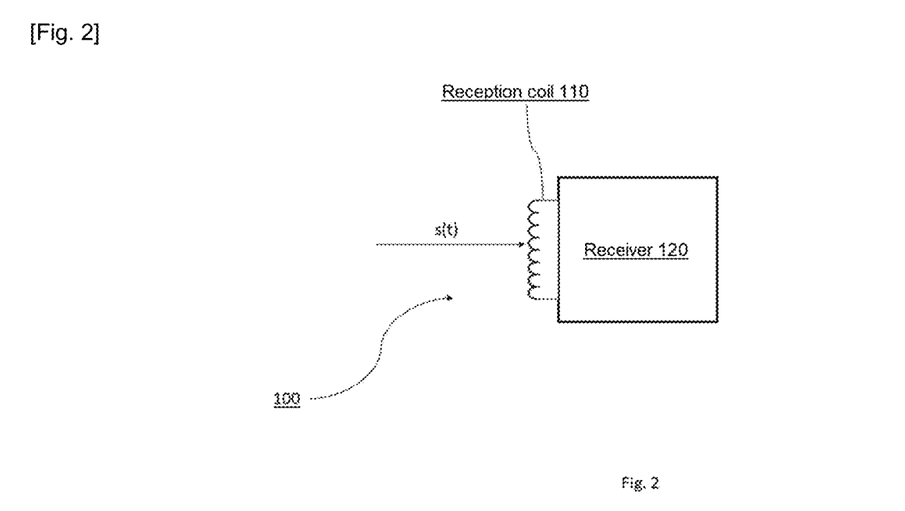
FIG. 2 shows a metal detector.

FIG. 2 illustrates a metal detector 100 which comprises a reception coil 110 and a sampled-architecture receiver 120.

In particular, the reception coil 110, of known type, is arranged to receive a magnetic field signal, called reception signal.

In particular, the reception coil 110 is configured to sense the remanent magnetization of the metallic object after its magnetization by a transmission coil (not shown).

FIG. 2 illustrates the reception coil 110 which receives a reception signal s(t) with t representing time.

In practice, the reception signal s(t) is a continuous-time real analog signal.

The term "continuous-time" should be understood to mean a field of values representative of time which is defined by an uncountable set in a finite time window.

Moreover, the reception signal s(t) is representative of at least one modification of the detection magnetic field under the influence of the metallic object.

In other words, the metallic object modifies the detection magnetic field and the reception signal s(t) modulates this modification of the magnetic field.

In a known manner, the reception signal s(t) is amplified with a Low Noise Amplifier (LNA) before delivering the amplified reception signal to the sampled-architecture receiver 120.

In the invention, the sampled-architecture receiver 120 comprises a first sampling device of non-quantizer type, called first sampler.

Figure 3:
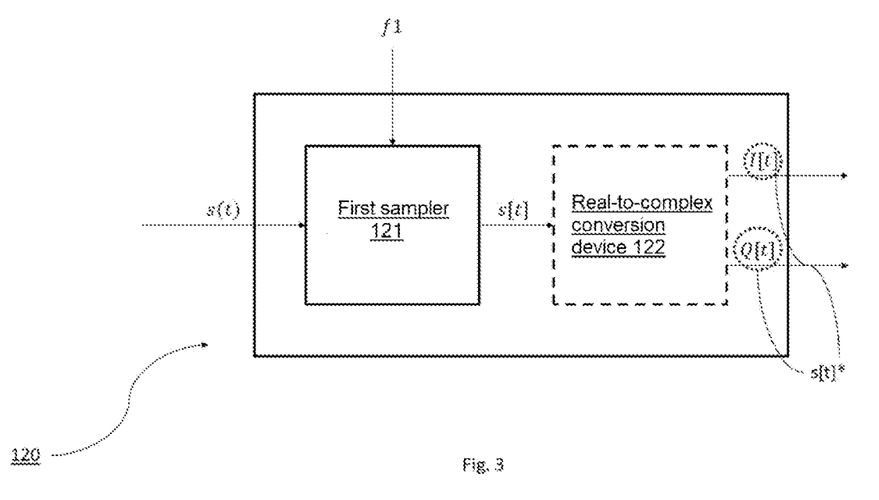
FIG. 3 shows a receiver of the metal detector of FIG. 2 according to the invention.

FIG. 3 illustrates a sampled-architecture receiver 120 which comprises a first sampler 121.

In practice, the first sampler 121 is a sampling device of known type, but which does not necessarily comprise the quantization operation or the encoding operation.

For example, the first sampler 121 can be a sample and hold circuit which is devoid of the quantization operation and the encoding operation.

In the invention, the first sampler 121 is configured to sample the reception signal s(t) at a first sampling frequency which observes the Nyquist-Shannon bandwidth sampling theorem (also known as bandpass sampling or undersampling or subsampling or downsampling or sub-Nyquist or super-Nyquist or harmonic sampling).

As a reminder the Nyquist-Shannon bandwidth sampling theorem is an extension of the "classic" Nyquist-Shannon theorem to be applied to a narrowband signal. Namely, the sampling is performed as a function of the bandwidth instead of the maximum frequency of the reception signal s(t).

Figure 4:
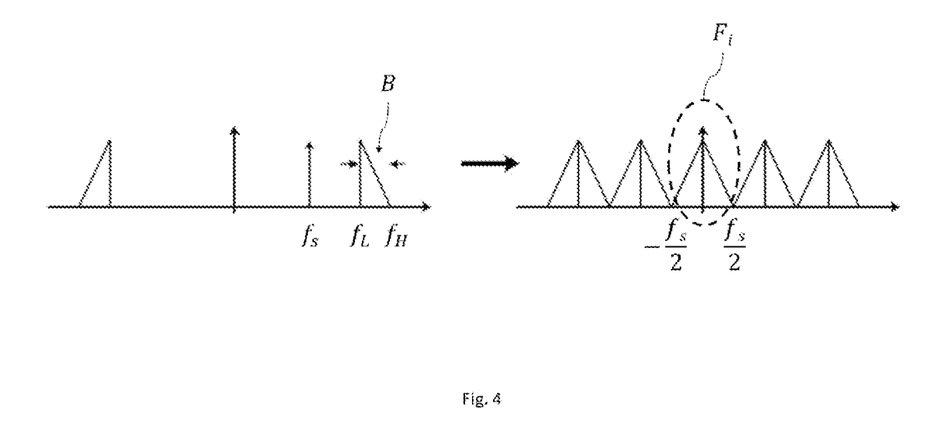
FIG. 4 shows an illustration of the Nyquist-Shannon bandwidth sampling theorem.

FIG. 4 illustrates this theorem for a bandwidth signal which is bounded between $f_L$ and $f_H$.

In practice, this theorem states that it is possible to reconstruct a signal if the sampling frequency $f_S$ of the signal is at last equal to double the width of the bandwidth of the signal (i.e., the frequency band between $f_L$ and $f_H$). Thus, according to this theorem, the signal can be deliberately spectrally aliased so that at least one of its spectral aliases is then transposed to an intermediate frequency or into the baseband. In practice, the useful signal is transposed to an intermediate frequency, $F_i$, between the baseband and half the sampling frequency $$\left(\text{i.e., } \pm \frac{f_S}{2}\right).$$

In other words, the Nyquist-Shannon bandwidth sampling theorem makes it possible to transpose or demodulate a narrowband signal around a given frequency by sampling at a lower frequency than the given frequency, under the condition that the sampling frequency is greater than at least twice the bandwidth of the signal for a real signal and at least once the bandwidth for a complex signal. This is because the spectrum of a sampled signal of this kind is found repeated, without superimpositions, around multiples of the sampling frequency. Among these aliases, the ones located in the baseband or close to the baseband make it possible to perform a demodulation of the bandwidth signal without using a mixer.

By extension, note that in the cases where the invention uses the Nyquist-Shannon bandwidth sampling theorem, it is necessary for the sampling frequency $f_S$ to be less than the detection frequency $f_D$ for a replica to undergo a frequency transposition.

In a first particular implementation, the following condition is observed: $f_S \leq 2 \times f_D$.

In a first aspect of the first particular implementation, the following condition is observed: $f_S \leq f_D$.

In a second aspect of the first particular implementation, the following condition is observed: $f_S < f_D$.

In a second particular implementation, the following condition is observed: the value of the quantity $$2 \times \frac{f_D}{f_S}$$

is not an integer.

In an aspect of the second particular implementation, the following condition is observed: the value of the quantity $f_D/f_S$ is not an integer.

Thus, in practice, in the invention it is necessary to observe the Nyquist-Shannon bandwidth sampling theorem, but most importantly, the "classic" Nyquist-Shannon sampling theorem must not be observed. This is because, if the "classic" Nyquist-Shannon sampling theorem is observed, it is impossible to have a frequency transposition.

In the context of the invention, FIG. 3 illustrates the first sampler 121 which uses a sampling frequency f1 which is chosen so as to observe the Nyquist-Shannon bandwidth sampling theorem as described above for a real signal.

In particular, the choice of the first sampling frequency f1 allows the first sampler 121 to deliver a discrete-time signal, called first sampled signal, which, in the spectral domain, corresponds to a replica signal of the reception signal s(t).

To do so, in this invention, the sampling frequency f1 is strictly less than the detection frequency, $f_D$.

In practice, a replica signal comprises a spectral replica of the reception signal s(t).

FIG. 3 illustrates the first sampler 121 which delivers a first sampled signal s[t], in response to the reception of the reception signal s(t) and as a function of the first sampling frequency f1.

In practice, the first sampled signal s[t] is a discrete-time analog sampled signal. As indicated above, such a signal is not yet quantized, but only sampled. By comparison, in conventional architectures, the analog signal remains on a continuous-time basis until the quantization in an analog-to-digital converter.

Furthermore, the choice of the first sampling frequency f1, for each detection channel, allows the first sampler 121 to frequency-transpose the reception signal s(t) to a first intermediate frequency which is less than the detection frequency, $f_D$, of the detection channel.

In practice, the first intermediate frequency can be found in the baseband.

In a first particular implementation of the invention, it can be advantageous to use signal processing techniques of the first sampled signal s[t] which are flexible and configurable.

To do so, the sampled-architecture receiver 120 further comprises processing means (not shown) of the first sampled signal s[t] which use discrete-time analog signal processing techniques.

For example, switched-capacitor systems with MOS switches for the switching could be used.

In a second particular implementation of the invention, it can be advantageous to digitally process the first sampled signal s[t], for example with a processor.

To do this, the sampled-architecture receiver 120 further comprises a quantizer (not shown) and an encoder (not shown).

In particular, the quantizer, which is coupled downstream of the first sampler 121, is configured to quantize the first sampled signal s[t], in such a way as to deliver a quantized signal. Furthermore, the encoder, which is coupled downstream of the quantizer, is configured to encode the quantized signal in such a way as to deliver a digital signal.

Of course, it may be envisioned to combine the quantizer and the encoder in a single device, and to do so without requiring any substantial modifications of the invention.

In a third particular implementation of the invention, it may be advantageous to convert the first sampled signal s[t] into a complex signal of IQ signal type, and to do so in order to simplify its processing. In this case, the sampled signal s[t] will preferably be at an intermediate frequency.

To do this, as illustrated in FIG. 3, the sampled-architecture receiver 120 further comprises a real-to-complex conversion device 122 that is coupled downstream of the first sampler 121.

In particular, the real-to-complex conversion device 122 is configured to convert the first sampled signal s[t], which is a real signal, into a complex signal of IQ signal type, as described above.

In FIG. 3, the real-to-complex conversion device 122 delivers a complex signal s[t]* in response to the reception of the first sampled signal s [t]. In particular, the complex signal s[t]* comprises an in-phase component I[t] and a quadrature component Q[t].

Of course, provision can be made for the real-to-complex conversion device 122 to deliver only the in-phase component I[t] and omit the quadrature component Q[t].

In an embodiment of the third particular implementation of the invention, it may be advantageous to use a simple and efficient structure for the real-to-complex conversion device 122.

Figure 5:
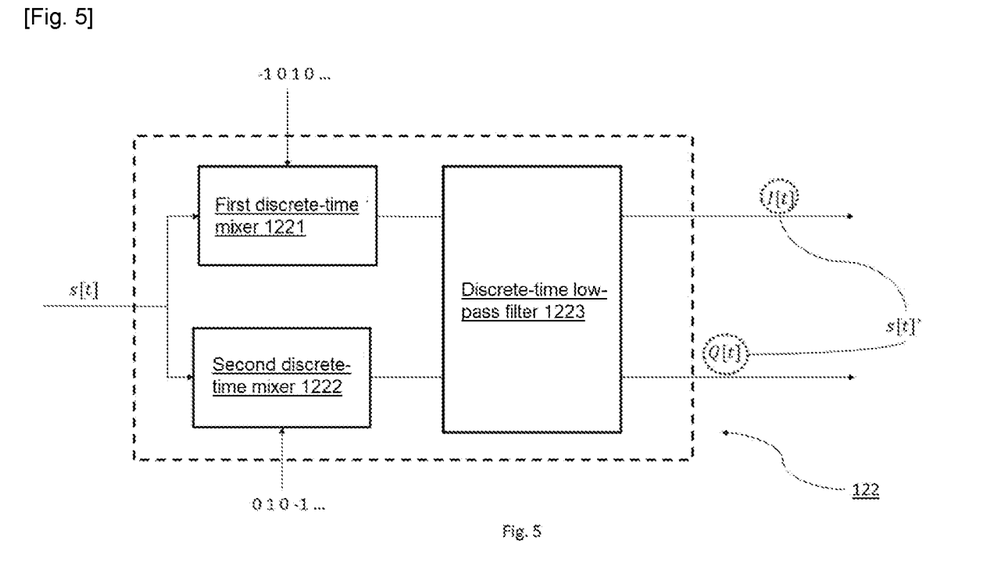
FIG. 5 shows a real-to-complex conversion device of the receiver of FIG. 4.

To do this, as illustrated in FIG. 5, the real-to-complex conversion device 122 comprises a first discrete-time mixer 1221, a second discrete-time mixer 1222, and at least one discrete-time low-pass filter 1223.

In practice, the first discrete-time mixer 1221 and the discrete-time low-pass filter 1223 are configured to deliver, for each sample of the first sampled signal s[t], the in-phase component I[t] of the complex signal s[t] *. While the second discrete-time mixer 1222 and the discrete-time low-pass filter 1223 are configured to deliver, for each sample of the first sampled signal s[t], the quadrature component Q[t] of the complex signal s[t] *.

Of course, provision can be made for using two low-pass filters instead of a single one. In this case, a first discrete-time low-pass filter can be coupled downstream of the first discrete-time mixer 1221 to obtain the in-phase component I[t] of the complex signal s[t] *. Moreover, a second discrete-time low-pass filter can be coupled downstream of the second discrete-time mixer 1222 to obtain the quadrature component Q[t] of the complex signal s[t]+.

Furthermore, in the embodiment of the third particular implementation of the invention, in order to reduce the required resources at processor level, it may be advantageous to optimize the ratio of the first sampling frequency f1 to the bandwidth in order to be able to choose the first sampling frequency f1 as low as possible.

To do this, the sampling frequency f1 is preferably chosen so that it observes the following relationship:

$$f_D \approx \left(\frac{2*n+1}{4}\right) \times f1 \qquad \text{[Math 11]}$$

with $f_D$ the detection frequency of a detection channel of the reception signal s(t), n' a natural integer, f1 the first sampling frequency and n a natural integer.

In a first example of the formula [Math 11], the following relationship can be used:

$$f_D = \left(\frac{4*n+1}{4}\right) \times f1 = \left(\frac{1}{4}+n\right) \times f1 \qquad \text{[Math 12]}$$

In this case, the term "quarter-band" configuration can be used.

In a second example of the formula [Math 11], the following relationship can be used:

$$f_D = \left(\frac{4*n+3}{4}\right) \times f1 = \left(\frac{3}{4}+n\right) \times f1 \qquad \text{[Math 13]}$$

In this case, the term "three-quarter band" configuration can be used.

With the arrangement according to the formula [Math 11] to choose the sampling frequency f1, the in-phase component I[t] and the quadrature component Q[t] of a complex signal s[t]* can be obtained using the first discrete-time mixer and the second discrete-time mixer with only multiplication coefficients from among the following factors:

−1, 0 and 1.

Moreover, one may envision the performing of additional optimizations by making use, for example, of the properties of the zero multiplication factors of the two samples. This is particularly the case for certain Finite Response Filter (FIR) topologies.

Moreover, other real-to-complex conversion techniques may be used, such as the Hilbert transform, without requiring substantial modifications of the invention.

In a fourth particular implementation of the invention, it may be advantageous to reduce the quantity of aliased noise during the sampling performed by the first sampler 121. Moreover, it may be advantageous to isolate the signal of a detection channel from the other detection channels if the transmitter of the metal detector 100 transmits several frequencies simultaneously.

Figure 6:
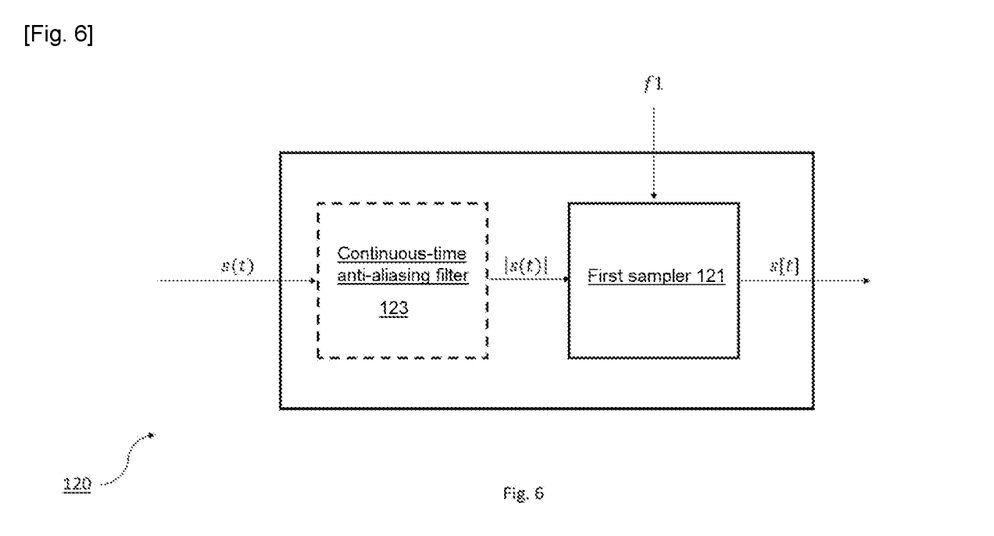
FIG. 6 shows an embodiment of a receiver of the metal detector of FIG. 2.

To do this, the sampled-architecture receiver 120 further comprises a continuous-time anti-aliasing filter.

FIG. 6 illustrates a continuous-time anti-aliasing filter 123 which is coupled upstream of the first sampler 121.

In particular, the continuous-time anti-aliasing filter 123 is configured to deliver a filtered reception signal |s(t)| in response to the reception of the reception signal s(t). In this case, the first sampler 121 delivers the first sampled signal s[t], in response to the reception of the filtered reception signal |s(t)|, which is thus a derivative of the reception signal s(t).

Furthermore, the continuous-time anti-aliasing filter 123 has a bandwidth which is configured to be centered on at least any one of the detection frequencies associated with the reception signal s(t), in such a way as to limit the bandwidth of the reception signal s(t) around at least any one of the detection frequencies.

In a first particular embodiment (not shown in FIG. 6) of the fourth particular implementation of the invention, provision can be made for adding the real-to-complex conversion device 122 downstream of the first sampler 121 to convert the first sampled signal s[t] into a complex signal of IQ signal type, and to do so in order to facilitate its processing.

In a second particular embodiment of the fourth particular implementation of the invention, it may be advantageous to dispense with the real-to-complex conversion device 122 described above.

Figure 7:
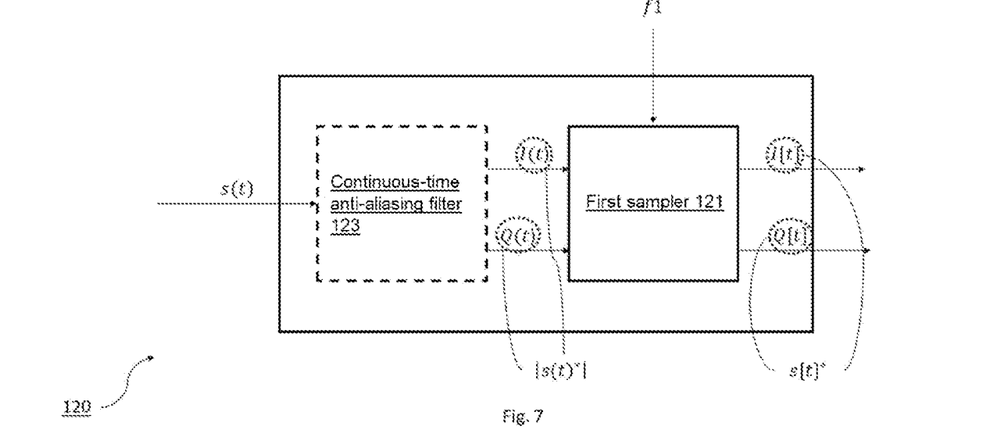
FIG. 7 shows a variant of the embodiment of FIG. 6.

To do this, the continuous-time anti-aliasing filter 123 can be chosen so that it is of the complex bandpass type. Thus, in addition to performing the filtering operation, such a filter is configured to filter out the negative frequencies. The signal transposed by the first sampler 121 can then be transposed into a complex signal of IQ signal type, as described above. Specifically, there will not be any aliasing of the negative frequencies inherent to the real signals.

FIG. 7 illustrates a continuous-time anti-aliasing filter 123 of complex bandpass type, which delivers a filtered complex reception signal |s(t)*|, which has an in-phase component I(t) and a quadrature component Q[t], in response to the reception of the reception signal s(t).

Moreover, in FIG. 7, the first sampler 121 is configured to sample the filtered complex reception signal |s(t)*| in such a way as to deliver a complex sampled signal |s(t)*| which comprises an in-phase component I[t] and the quadrature component Q[t].

In a fifth particular embodiment of the invention, it may be advantageous to simplify the configuration of the bandwidth filter, particularly in a system with a detection frequency, $f_D$ that is configurable and/or in a multichannel (i.e., multifrequency) system.

Figure 8:
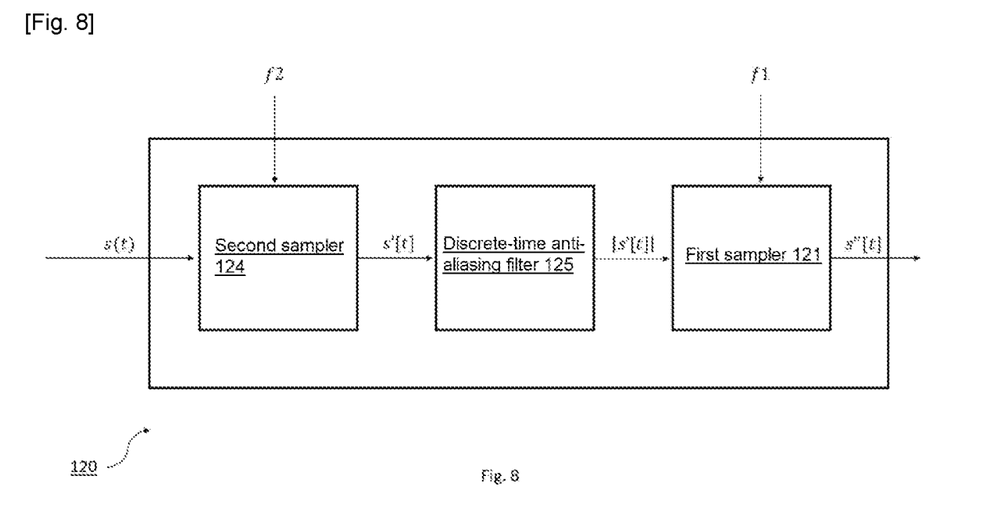
FIG. 8 shows another embodiment of a receiver of the metal detector of FIG. 2.

To do this, the sampled-architecture receiver 120 further comprises a second sampling device of non-quantizing type, said second sampler and a discrete-time anti-aliasing filter.

FIG. 8 illustrates a discrete-time anti-aliasing filter 125 that is coupled between the first sampler 121 and a second sampler 124.

In practice, the second sampler 124 is configured to sample the reception signal s(t) at a second sampling frequency that observes the Nyquist-Shannon bandwidth sampling theorem, as described above with reference to the first sampling frequency f1.

In a particular embodiment, in a multichannel (i.e., multifrequency) system, the second sampler 124 is shared by both reception channels.

FIG. 8 illustrates a second sampler 124 which uses a sampling frequency f2 which is chosen so as to observe the Nyquist-Shannon bandwidth sampling theorem as described above.

In particular, the choice of the second sampling frequency f2, allows the second sampler 124 to deliver a discrete-time signal, called second sampled signal, which, in the spectral domain, corresponds to a replica signal of the reception signal s(t).

To do this, in the invention, the sampling frequency f2 observes the following condition: $f2<2\times f_D$ is strictly less than the detection frequency, $f_D$.

In practice, a replica signal comprises a spectral replica of the reception signal s(t).

FIG. 8 illustrates the second sampler 124 which delivers a second sampled signal s'[t], in response to the reception of the reception signal s(t) and as a function of the second sampling frequency f2.

In practice, the second sampled signal s'[t], is a discrete-time analog sampled signal, which is a derivative of the reception signal s(t). As indicated above, such a signal is not yet quantized, but only sampled. By comparison, in conventional architectures, the analog signal remains on a continuous-time basis until the quantization in an analog-to-digital converter.

Furthermore, the choice of the second sampling frequency f2, for each detection channel, allows the second sampler 124 to frequency-transpose the reception signal s(t) to a second intermediate frequency which is greater than the first intermediate frequency and less than or equal to the detection frequency, $f_D$.

Moreover, the discrete-time anti-aliasing filter 125 is configured to deliver a sampled and filtered reception signal |s'[t]| in response to the reception of the second sampled signal s'[t]. Consequently, the first sampler 121 delivers a first sampled signal s"[t], in response to the reception of the second sampled and filtered signal |s'[t]|, which is a derivative of the reception signal s(t).

Furthermore, the discrete-time anti-aliasing filter 125 has a bandwidth which is configured to be centered on at least any one of the detection frequencies associated with the reception signal s(t), in such a way as to limit the bandwidth of the second sampled signal s'[t], around at least any one of the detection frequencies.

In a first embodiment of the fifth particular implementation of the invention, it may be advantageous to convert the first sampled signal s"[t] into a complex signal of IQ signal type, in order to simplify its processing.

Figure 9:
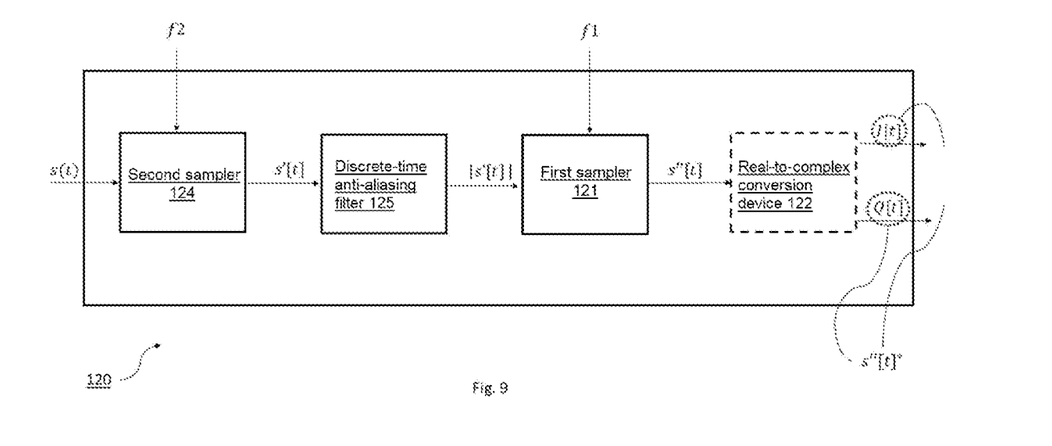
FIG. 9 shows a first variant of the embodiment of FIG. 8.

To do this, as illustrated in FIG. 9, the sampled-architecture receiver 120 further comprises the real-to-complex conversion device 122 as described above in relation to FIG. 2, and which is coupled downstream of the first sampler 121.

In particular, the real-to-complex conversion device 122 is configured to convert the first sampled signal s"[t], which is a real signal, into a complex signal of IQ signal type, as described above.

In FIG. 9, the real-to-complex conversion device 122 delivers a complex signal s"[t]* in response to the reception of the first sampled signal s"[t]. In particular, the complex signal s"[t]* comprises an in-phase component I[t] and a quadrature component Q[t].

Of course, provision can be made for the real-to-complex conversion device 122 to deliver only the in-phase component I[t] and omit the quadrature component Q[t].

In a second embodiment of the fifth particular implementation of the invention, it may be advantageous to dispense with the real-to-complex conversion device 122 described above.

Figure 10:
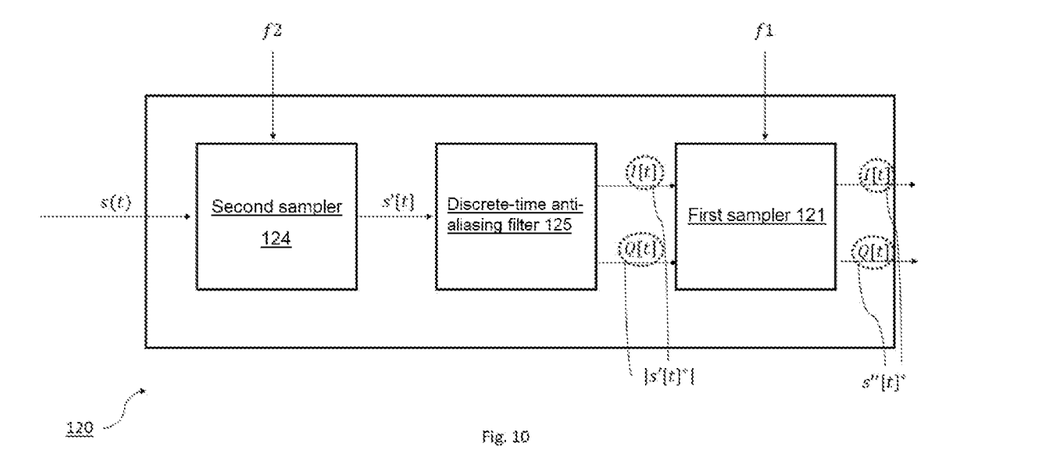
FIG. 10 shows a second variant of the embodiment of FIG. 8.

To do this, the discrete-time anti-aliasing filter 125 may be chosen so that it is of complex bandpass type. Thus, in addition to performing the filtering operation, such a filter is configured to filter out the negative frequencies. The signal transposed by the second sampler 124 can then be transposed into a complex signal of IQ signal type, as described above. Specifically, there will be no aliasing of the negative frequencies inherent to the real signals.

FIG. 10 comprises the same elements as on FIG. 8 and illustrates a discrete-time anti-aliasing filter 125 of complex bandpass type which delivers a sampled and filtered complex reception signal |s'[t]*| which has an in-phase component I[t] and a quadrature component Q[t], in response to the reception of the second sampled signal s'[t].

Moreover, in FIG. 10, the first sampler 121 is configured to sample the sampled and filtered complex reception signal |s'[t]*|, in such a way as to deliver a complex sampled signal s"[t]* which comprises an in-phase component I[t] and the quadrature component Q[t].

In a third embodiment of the fifth particular implementation of the invention, it may be advantageous for the frequency conversion by the first sampling frequency f1 to be a fraction instead of a multiple of f1.

Figure 11:
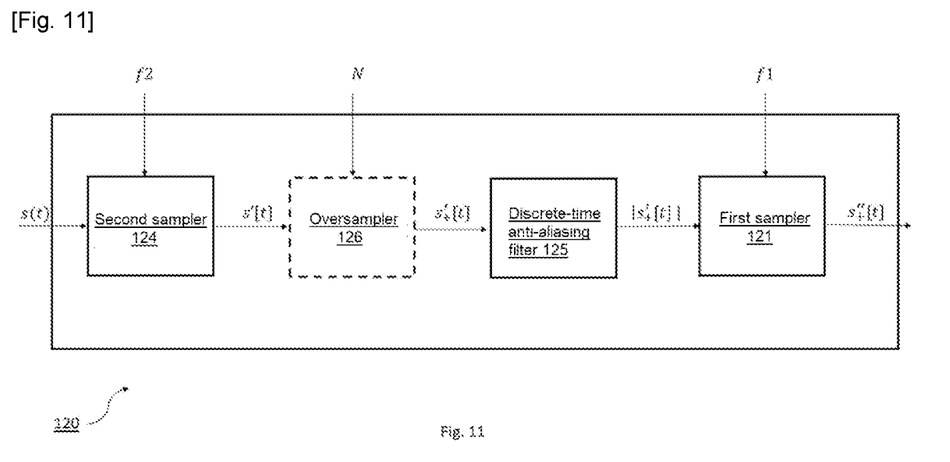
FIG. 11 shows a third variant of the embodiment of FIG. 8.

To do this, the sampled-architecture receiver 120 further comprises an oversampling device of non-quantizing type, called an oversampler.

FIG. 11 comprises the same elements as on FIG. 8 and illustrates an oversampler 126 that is coupled between the second sampler 124 and the anti-aliasing filter 125.

The oversampler 126 makes it possible to raise the second sampled signal s'[t], to a third sampling frequency by interpolation and decimation according to a given oversampling factor.

In practice, for an oversampling factor N, the oversampler 126 inserts between each sample of the second sampled signal s'[t], (N−1) new samples, the value of which is zero. Thus, the oversampler 126 delivers at the output a signal of a frequency N times higher than that of the second sampled signal s'[t] and with a Fourier transform composed of N aliases of the Fourier transform of the input signal.

In particular, in FIG. 11, the oversampler 126, which has an oversampling factor of N, receives the second sampled signal s'[t] and delivers an oversampled version s'$_+$[t] of the second sampled signal s'[t].

Moreover, the discrete-time anti-aliasing filter 125 is configured to deliver a sampled and filtered reception signal |s'$_+$[t]| in response to the reception of the second sampled signal s'[t]. Subsequently, the first sampler 121 delivers a first sampled signal s"$_+$[t], in response to the reception of the second sampled and filtered signal | s'$_+$[t]|, which is a derivative of the reception signal s(t).

The invention has been described and illustrated. However, the invention is not limited to the forms of embodiment that have been described. Thus, those skilled in the art can deduce other variants and embodiments, on reading the description and the appended figures.

In a first embodiment, the metal detector 100 further comprises at least one transmission coil arranged to generate the detection magnetic field.

In a second embodiment, the metal detector comprises several sampled-architecture receivers 120, in which each sampled-architecture receiver 120 is configured to process the reception signal, s(t), at a particular detection frequency, $f_D$.

In an example of the second embodiment, the metal detector further comprises means for selecting, automatically or at the command of the user, the detection frequency or frequencies.

In a third embodiment, the metal detector further comprises,
  a support stick,
  a detection head which is disposed at one end of the support stick, and which is configured to house the reception coil(s) and/or the transmission coil(s), and
  at least one processor coupled to the detection head and configured to manage the operation of the detection head and make use of the information coming from it.

In a first example of the third embodiment, the metal detector comprises one or more processors.

In a second example of the third embodiment, the metal detector further comprises an electronic control unit to house the processor(s) and which is disposed at another end of the support stick.

In a third example of the third embodiment, the metal detector further comprises an operator headset which is coupled to the processor(s) and which is configured to transmit to the operator a detection audio signal which is representative of the detection of a metallic object.

The invention can be the subject of many variants and applications other than those described above. In particular, unless otherwise specified, the different structural and functional features of each of the implementations described above must not be considered as combined and/or closely and/or inextricably linked to one another, but on the contrary, as simple juxtapositions. Furthermore, the structural and/or functional features of the different embodiments described above can be the subject, wholly or in part, of any different juxtaposition or of any different combination.

The invention claimed is:

1. A metal detector for detecting at least one metallic object exposed to a detection magnetic field, the metal detector comprising:
   at least one reception coil arranged to receive a magnetic field signal, called reception signal, which is representative of at least one modification of the detection magnetic field under the influence of the at least one metallic object, the reception signal, comprising at least one detection channel of given bandwidth, each detection channel being associated with a separate detection frequency, $f_D$, and
   at least one sampled-architecture receiver which is coupled to the at least one reception coil,
   wherein,
     the at least one sampled-architecture receiver comprises a first sampling device of non-quantizing type, called first sampler, which is configured to sample the reception signal or a signal that is a derivative of the reception signal, at a first sampling frequency, f1, in such a way as to
     deliver a discrete-time signal, called first sampled signal, which, in the spectral domain, corresponds to a replica signal of the reception signal, or of the signal that is a derivative of the reception signal, and
     frequency-transpose the reception signal, to a first intermediate frequency which is less than the separate detection frequency, $f_D$.

2. The metal detector as claimed in claim 1, wherein the at least one sampled-architecture receiver further comprises a real-to-complex conversion device which is coupled downstream of the first sampler, and which is configured to convert the first sampled signal into a complex signal which has an in-phase component and a quadrature component.

3. The metal detector as claimed in claim 2, wherein the first sampling frequency, f1, observes the following relationship:

$$f_D \approx \left(\frac{2*n+1}{4}\right) \times f1,$$

with $f_D$ the detection frequency of the detection channel of the reception signal, n a natural integer and f1 the first sampling frequency, and wherein,
   the real-to-complex conversion device comprises a first discrete-time mixer, a second discrete-time mixer, a discrete-time low-pass filter, the discrete-time low-pass filter being coupled,
     downstream of the first discrete-time mixer in such a way as to deliver the in-phase component, and
     downstream of the second discrete-time mixer in such a way as to deliver the quadrature component.

4. The metal detector as claimed in claim 1, wherein the at least one sampled-architecture receiver further comprises a continuous-time anti-aliasing filter which is coupled upstream of the first sampler, the continuous-time anti-aliasing filter having a bandwidth which is configured to be centered on at least any one of the detection frequencies associated with the reception signal in such a way as to limit the bandwidth of the reception signal around at least any one of the detection frequencies and to deliver a filtered reception signal.

5. The metal detector as claimed in claim 1, wherein the at least one sampled-architecture receiver further comprises,
a second sampling device of non-quantizing type, said second sampling device coupled upstream of the first sampler, and
a discrete-time anti-aliasing filter coupled between the first sampler and the second sampling device,
wherein,
the second sampling device is configured to sample the reception signal at a second sampling frequency, f2, which observes the Nyquist-Shannon bandwidth sampling theorem, such as to deliver a signal that is a derivative of the reception signal, called second sampled signal which, in the spectral domain, corresponds to a replica signal of the reception signal, and
the discrete-time anti-aliasing filter has a bandwidth which is configured to be centered on at least any one of the detection frequencies associated with the reception signal in such a way as to limit the bandwidth of the second sampled signal around at least any one of the detection frequencies and to deliver a sampled and filtered reception signal,
and wherein, the second sampling frequency, f2, is furthermore configured to frequency-transpose the reception signal, to a second intermediate frequency which is greater than the first intermediate frequency and less than or equal to the detection frequency $f_D$.

6. The metal detector as claimed in claim 5, further comprising an oversampling device of non-quantizing type, called oversampler, coupled between the second sampling device and the discrete-time anti-aliasing filter.

7. The metal detector as claimed in claim 5, wherein the continuous-time anti-aliasing filter and/or the discrete-time anti-aliasing filter is a filter of complex bandpass type which is configured to convert the reception signal, or a signal that is a derivative of the reception signal, into a filtered complex signal, which has an in-phase component, and a quadrature component.

8. The metal detector as claimed in claim 5, wherein the at least one sampled-architecture receiver further comprises a quantizer and an encoder, the quantizer being configured to quantize the first sampled signal, and/or the second sampled signal in such a way as to deliver a quantized signal, the encoder being configured to encode the quantized signal in such a way as to deliver a digital signal.

9. The metal detector as claimed in claim 1, wherein the detection frequency or frequencies are chosen from among: a first frequency band having a range between 3 kHz and 30 kHz approximately, and a second frequency band having a range between 20 Hz and 200 kHz approximately.

10. The metal detector as claimed in claim 1, further comprising at least one transmission coil arranged to generate the detection magnetic field.

11. The metal detector as claimed in claim 1, comprising several sampled-architecture receivers, in which each sampled-architecture receiver is configured to process the reception signal at a particular detection frequency, $f_D$.

12. The metal detector as claimed in claim 11, further comprising means for selecting, automatically or at the command of the user, the detection frequency or frequencies.

13. The metal detector as claimed in claim 1, further comprising,
a support stick,
a detection head which is disposed at one end of the support stick, and which is configured to house the at least one reception coil and/or at least one transmission coil, and
at least one processor coupled to the detection head and configured to manage operation of the detection head and make use of the information coming from it.

* * * * *